United States Patent Office 3,126,267
Patented Mar. 24, 1964

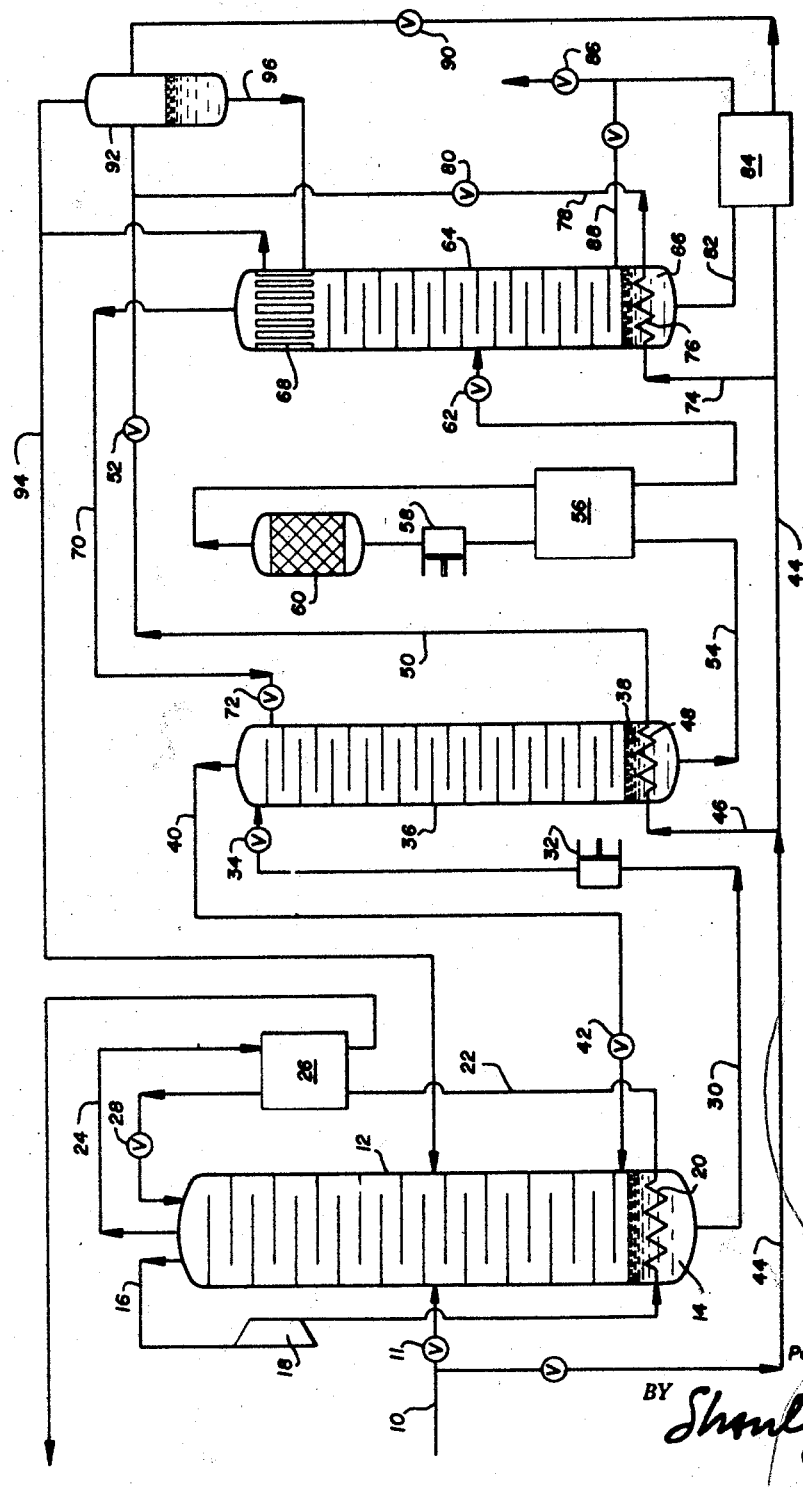

3,126,267
SEPARATING ISOTOPES OF HYDROGEN
Peter C. Vander Arend, Allentown, Pa., assignor, by mesne assignments, to Air Products and Chemicals, Inc., Trexlertown, Pa., a corporation of Delaware
Filed July 24, 1959, Ser. No. 829,275
8 Claims. (Cl. 62—27)

The present invention relates to the separation of mixtures of isotopes of hydrogen by the low temperature liquefaction and fractionation thereof.

The two naturally occurring isotopes are hydrogen and deuterium. These reversably associated according to the relationship.

$$H_2 + D_2 = 2HD$$

However, deuterium is present in hydrogen in such extremely small quantities that this reversible association is driven to the right by the great excess of hydrogen. Representative concentrations are, for example, one mol of hydrogen deuteride in 3500 mols of hydrogen, and one mol of deuterium as such in 16,000 mols of hydrogen. Accordingly, for all practical purposes, deuterium may be thought of as being ordinarily present in hydrogen as hydrogen deuteride.

The separation of such tiny quantities of hydrogen deuteride from hydrogen is useful as an early step in the production of deuterium oxide, or heavy water. As is well known, heavy water is used as a moderator for the slowing of fast neutrons in nuclear reactors and may in addition be used as a combined moderator-coolant with natural uranium fuel. Particularly with the advent of nuclear power reactors, the consumption of heavy water is rapidly increasing and the need for quantity production of this substance at relatively low cost is becoming increasingly urgent.

Once the hydrogen deuteride has been separated in fair purity, the equilibrium of the above equation can be stabilized by catalysis and the deuterium separated from the hydrogen and hydrogen deuteride and oxidized to heavy water.

According to the present invention, it has been discovered that mixtures of very small quantities of deuterium as hydrogen deuteride in hydrogen can be separated at high thermal efficiency and with good product recovery and concentration by cooling and partially condensing the mixture, continuously introducing it into a fractionating zone, continuously withdrawing from the zone as overhead a quantity of vapor in an amount several times the amount of the total feed, compressing at the temperature of the fractionating zone the withdrawn vapor at most several pounds per square inch, condensing it in the evaporator of the fractionating zone, and reintroducing it adjacent the top of the zone as wash liquid. The liquid collecting at the bottom of the zone is withdrawn in liquid phase, pumped to a higher pressure, and subsequently fractionated to give a bottoms product of good purity hydrogen deuteride which is then driven catalytically to disassociate to equilibrium and further fractioned to provide a bottoms product of deuterium as such which in turn may be oxidized in known manner to produce heavy water.

There is thus provided a cycle for separating isotopes of hydrogen, in which both good recovery and good product purity are combined with high efficiency operation, and it is the principal object of the present invention to provide methods and apparatus for carrying out such a cycle.

Other objects and advantages of the present invention will become apparent from the following description taken in connection with the accompanying drawing, which represents schematically an illustrative embodiment of a cycle for separating hydrogen isotopes according to the present invention.

Referring now to the drawing in greater detail, there is shown a cycle in which hydrogen having one part in 3500 hydrogen deuteride admixed therein is fed through a conduit 10 at a pressure of about 220 p.s.i.a. and is expanded through a valve 11 and fed into a fractionating column 12. The feed gas entering column 12 is at a temperature of 20.49° K. and a pressure of 20 p.s.i.a. and is about 20% in liquid phase. The liquid in column 12 tends to collect as a bottoms product in pool 14.

Overhead from column 12 is withdrawn through conduit 16 in a quantity about three times the quantity of feed and is compressed about 7 p.s.i. in rotary compressor 18, and is then condensed in evaporator 20 located in pool 14 and leaves through conduit 22.

Overhead from column 12 in about the same quantity as the feed to column 12 is withdrawn through conduit 24 and passed through heat exchanger 26 and thence to heat exchange with the feed (not shown) and thereafter leaves the cycle. The liquid in conduit 22 is thus subcooled by the waste gas and is "expanded" through pressure reducing valve 28 and introduced into the top of column 12 as wash liquid.

The liquid in pool 14 has a composition of about 5% hydrogen deuteride, balance essentially hydrogen, and is withdrawn through conduit 30 at a rate equal to about 0.5% of the feed rate. This liquid is urged by pump 32 past control valve 34 and into the top of secondary fractionating column 36 in the bottom of which collects a pool 38 of boiling liquid which is substantially pure hydrogen deuteride, that is, 90–100% pure. The overhead from column 36 has a composition of about 3–4% hydrogen deuteride, balance hydrogen, and is returned through conduit 40 past control valve 42 into column 12 just above pool 14, which is the level closest to its composition level. It will be appreciated that the pressure imposed upon the liquid flowing through conduit 30 by pump 32 is only just sufficient to raise the liquid to the top of column 36 and to impose on column 36 sufficient pressure that gas will flow through conduit 40 back into column 12.

A branch conduit 44 extends from the feed conduit 10, and a portion of feed gas is diverted through conduit 44. A portion of the gas in conduit 44 at a pressure of 220 p.s.i.a. passes through conduit 46 and evaporator 48 located in pool 38 thereby to supply the heat requirements of column 36, and then through conduit 50, past expansion valve 52.

The bottoms product from column 36 is withdrawn through conduit 54 at a pressure of 22 to 25 p.s.i.a. and is passed through heat exchanger 56 where it is vaporized and warmed to about ambient temperature. It is then raised in pressure by compressor 58 to a pressure of 24 to 27 p.s.i.a. and is contacted in vapor phase with a finely divided nickel catalyst in catalytic chamber 60 so as to drive the relationship $$2HD = H_2 + D_2$$

toward equilibrium. The gas leaving chamber 60 has a composition of 25% hydrogen, 25% deuterium as such, balance hydrogen deuteride, and is cooled in exchanger 56 and passes through control valve 62 and is introduced in 60–70% liquid phase into fractionating column 64.

In column 64, the liquid phase collects in a pool 66 having a composition 99.5% deuterim as such, balance hydrogen deuteride, reflux for this separation being provided by a condenser 68. The overhead from column 64 leaves through conduit 70, and since it comprises about 3% hydrogen deuteride and 97% hydrogen, it is returned past control valve 72 into column 36 at the appropriate composition level.

The heat requirements for column 64 are supplied by conduit 74 branched from conduit 44, leading to evaporator 76 and thence to conduit 78 which includes expansion valve 80. The bottoms in pool 66 is withdrawn through conduit 82 and passed through exchanger 84 where it is warmed against feed gas in conduit 44 and then through flow control valve 86 on its way to an oxidizer (not shown) for conversion to heavy water. Alternatively, the product from pool 66 may be withdrawn in vapor phase immediately thereabove through conduit 88.

The stream of feed composition in conduit 44 downstream of exchanger 84 is passed through expansion valve 90 and introduced partly in liquid phase into phase separator 92. The streams in conduits 50 and 78 are merged and also introduced into separator 92. The overhead from separator 92 leaves through conduit 94 and the liquid phase in separator 92 leaves through conduit 96 and is vaporized in condenser 68, the resulting vapor being introduced into conduit 94. At the same time, this vaporization condenses wash liquid for column 64. The merged stream in conduit 94 is of feed gas composition and is introduced into column 12 at the level of conduit 10.

Accordingly, it will be appreciated that the objects of this invention have been achieved.

It is to be understood that the appended claims are to be accorded a range of equivalents commensurate in scope wtih the advance made over the prior art.

What is claimed is:

1. A method of separating isotopes of hydrogen, comprising feeding into a fractionation zone at condensation temperature hydrogen having a small proportion of deuterium to produce overhead and a pool of liquid in said zone, withdrawing overhead from said zone at a first temperature, introducing thus-withdrawn overhead at said first temperature into a compressor, compressing the introduced overhead at most several pounds per square inch, discharging compressed overhead from the compressor at a second temperature, introducing thus-compressed overhead at said second temperature into heat exchange with liquid of said pool of liquid to liquefy thus-compressed overhead, and returning thus-liquefied overhead to said zone above the feed and substantially at the pressure existing in said zone.

2. Apparatus for separating isotopes of hydrogen, comprising means for feeding into a fractionation zone at condensation temperature hydrogen having a small proportion of deuterium to produce overhead and a pool of liquid in said zone, a compressor, means for withdrawing overhead from said zone at a first temperature and for introducing thus-withdrawn overhead at said first temperature into the compressor, means for discharging compressed overhead from the compressor at a second temperature, means for introducing thus-compressed overhead at said second temperature into heat exchange with liquid of said pool of liquid to liquefy thus-compressed overhead, and means for returning thus-liquefied overhead to said zone above the feed, the last-named means including expansion means.

3. A method of separating isotopes of hydrogen, comprising feeding into a fractionation zone at condensation temperature hydrogen having a small proportion of deuterium to produce overhead and a pool of liquid in said zone, withdrawing overhead from said zone at a first temperature at several times the feed rate, introducing thus-withdrawn overhead at said first temperature into a compressor, compressing the introduced overhead at most several pounds per square inch, discharging compressed overhead from the compressor at a second temperature, introducing thus-compressed overhead at said second temperature into heat exchange with liquid of said pool of liquid to liquefy thus-compressed overhead, and returning thus-liquefied overhead to said zone above the feed and substantially at the pressure existing in said zone.

4. Apparatus for separating isotopes of hydrogen, comprising means for feeding into a fractionation zone at condensation temperature hydrogen having a small proportion of deuterium to produce overhead and a pool of liquid in said zone, a compressor, means for withdrawing overhead from said zone at a first temperature at several times the feed rate and for introducing thus-withdrawn overhead at said first temperature into the compressor, means for discharging compressed overhead from the compressor at a second temperature, means for introducing thus-compressed overhead at said second temperature into heat exchange with liquid of the pool of liquid to liquefy thus-compressed overhead, and means for returning thus-liquefied overhead to said zone above the feed, the last-named means including expansion means.

5. A method of separating isotopes of hydrogen, comprising feeding into a fractionation zone at condensation temperature hydrogen having a small proportion of deuterium to produce overhead and a pool of liquid in said zone, withdrawing overhead from said zone and segregating withdrawn overhead into two streams of which one is substantially larger than the other, compressing overhead of the larger stream, liquefying thus-compressed overhead by heat exchange with liquid of said pool of liquid, subcooling thus-liquefied overhead by heat exchange with overhead of said other stream, and returning thus-subcooled overhead to said zone above the feed and substantially at the pressure existing in said zone.

6. Apparatus for separating isotopes of hydrogen, comprising means for feeding into a fractionation zone at condensation temperature hydrogen having a small proportion of deuterium to produce overhead and a pool of liquid in said zone, means for withdrawing overhead from said zone and segregating withdrawn overhead into two streams of which one is substantially larger than the other, a compressor for compressing overhead of the larger stream, means for liquefying thus-compressed overhead by heat exchange with liquid of said pool of liquid, means for subcooling thus-liquefied overhead by heat exchange with overhead of said other stream, and means for returning thus-subcooled overhead to said zone above the feed, the last-named means including expansion means.

7. A method of separating isotopes of hydrogen, comprising feeding into a first fractionation zone at condensation temperature hydrogen having a small proportion of deuterium to produce overhead and a pool of liquid containing deuterium, introducing liquid from the pool into a second fractionation zone to produce overhead containing deuterium and a pool of liquid containing deuterium, returning overhead from the second fractionation zone to the first fractionation zone, fractionating liquid from the latter pool to produce overhead containing deuterium and a liquid rich in deuterium, and returning overhead from the last fractionating operation to a preceding fractionation zone.

8. Apparatus for separating isotopes of hydrogen, comprising means for feeding into a first fractionation zone at condensation temperature hydrogen having a small proportion of deuterium to produce overhead and a pool of liquid containing deuterium, means for introducing liquid from the pool into a second fractionation zone to produce overhead containing deuterium and a pool of liquid containing deuterium, means for returning overhead from the second fractionation zone to the first fractionation zone, means for fractionating liquid from the latter pool to produce overhead containing deuterium and a liquid rich in deuterium, and means for returning overhead from the last fractionating operation to a preceding fractionation zone.

References Cited in the file of this patent

UNITED STATES PATENTS

| | | |
|---|---|---|
| 2,645,104 | Kniel | July 14, 1953 |
| 2,729,954 | Etienne | Jan. 10, 1956 |
| 2,820,352 | Fokker et al. | Jan. 21, 1958 |

FOREIGN PATENTS

| | | |
|---|---|---|
| 561,840 | Canada | Aug. 12, 1958 |

OTHER REFERENCES

Murphy: "Production of Heavy Water," published by McGraw-Hill Book Co., New York, 1955 (chapter four relied on).